US006845252B2

(12) United States Patent
Digiandomenico et al.

(10) Patent No.: US 6,845,252 B2
(45) Date of Patent: Jan. 18, 2005

(54) PROGRAMMABLE ECHO CANCELLATION FILTER

(75) Inventors: Antonio Digiandomenico, Villach (AT); Peter Pessl, Villach (AT); Christian Fleischhacker, Pischeldorf (AT)

(73) Assignee: Infineon Technologies AG, Munich (DE)

( * ) Notice: Subject to any disclaimer, the term of this patent is extended or adjusted under 35 U.S.C. 154(b) by 603 days.

(21) Appl. No.: 09/975,768

(22) Filed: Oct. 11, 2001

(65) Prior Publication Data

US 2002/0119753 A1 Aug. 29, 2002

(30) Foreign Application Priority Data

Oct. 11, 2000 (DE) ........................................ 100 50 336

(51) Int. Cl.[7] ............................. H04M 1/00; H04B 3/20
(52) U.S. Cl. ...................... 455/570; 455/63.1; 455/501; 455/114.2; 379/406.01; 379/406.08; 379/390.02
(58) Field of Search ............................... 455/63.1, 501, 455/504, 505, 67.13, 69, 73, 84, 75, 557, 570, 114.2; 370/289–290; 379/406.01, 406.05, 406.06, 406.08, 390.02

(56) References Cited

U.S. PATENT DOCUMENTS

| 4,608,464 A | | 8/1986 | Morikawa et al. ........ 179/170.2 |
| 4,766,589 A | * | 8/1988 | Fisher ......................... 370/291 |
| 5,856,758 A | * | 1/1999 | Joffe et al. ..................... 330/85 |
| 6,408,008 B1 | * | 6/2002 | Komarek et al. ............ 370/458 |
| 6,636,605 B1 | * | 10/2003 | Randahl et al. ......... 379/406.01 |

FOREIGN PATENT DOCUMENTS

WO  PCT/DE00/00349  8/2000  ............ H04B/3/23

* cited by examiner

*Primary Examiner*—Binh Tieu
*Assistant Examiner*—Dionne Harvey
(74) *Attorney, Agent, or Firm*—Fish & Richardson P.C.

(57) ABSTRACT

Programmable echo cancellation filter for echo signal cancellation for a transceiver having a signal input (13) for receiving the transmission signal emitted by the transceiver (1), an input resistor (36) connected to the signal input (13), an operational amplifier (39), whose signal input (38) is connected to the input resistor (36) and whose signal output (41) is connected to an output resistor (43), a first programmable resistor circuit (48), which is provided between the signal output (41) of the operational amplifier (39) and the signal input (38) of the operational amplifier, a second programmable resistor circuit (51), which is provided between the output resistor (43) and a signal output (15) of the echo cancellation filter (14), a third programmable resistor circuit (55) which is provided between the first programmable resistor circuit (48) and the signal output (15) of the echo cancellation filter (14), the programmable resistor circuits (48, 51, 55) each having a plurality of resistors (65) which are terminated in parallel and are connected to a first terminal (68) of an associated controllable switch (66), the controllable switches (66) having a second terminal (69) connected to a virtual reference voltage terminal with a very low voltage swing.

17 Claims, 4 Drawing Sheets

PROGRAMMABLE ECHO CANCELLATION FILTER

FIELD OF THE INVENTION

The invention relates to a programmable echo cancellation filter for echo signal cancellation of echo signals of a transceiver.

BACKGROUND OF THE INVENTION

In signal transmission systems, when a transmission signal is emitted from a transceiver to a signal line, echo signals superposed on the reception signal always occur. In this case, on account of the attenuation of the signal line, the amplitude of the echo signal is significantly higher than the amplitude of the reception signal. A transceiver contains an echo cancellation filter in order to attenuate or extinguish the echo signal superposed on the reception signal.

FIG. 1 shows a transceiver according to the prior art, which contains an echo cancellation filter EC. The data to be transmitted by the transceiver are emitted from a data source DQ to a digital/analog converter DAC, where they are converted into an analog transmission signal and filtered in an analog filter connected downstream. The filtered transmission data pass via a signal line driver LT to a hybrid circuit, from where they are emitted via the signal line to a terminal device, for example to a subscriber modem.

An echo signal whose signal amplitude is significantly higher than the signal amplitude of the signal received by the terminal device EG is superposed on the reception signal $S_1$ of the transceiver. In a signal matching circuit, the reception signal $S_1$ with the superposed echo signal is prefiltered and the signal amplitudes are matched to the transceiver. The echo signal $S_2$ is fed to the signal matching circuit B, from where it passes to the echo cancellation filter EC. The echo cancellation filter EC simulates the frequency response of the transmission signal path. The echo signal filtered by the echo cancellation filter EC is subtracted from the superposed reception signal in a subtraction circuit SUB, with the result that, in the ideal case, the automatic amplitude control circuit AGC receives the reception signal from which the echo signal has been eliminated.

The strength of the echo signal depends on the line impedance of the signal line, which fluctuates greatly in a manner dependent on the line length and on ambient influences. Therefore, each time a connection is set up between the transceiver and the terminal device EG connected via the signal line, the echo cancellation filter EC is dynamically matched anew to the present line impedance in a so-called training phase. For this purpose, the echo cancellation circuit EC is correspondingly set by a control circuit. This is done by means of controllable switches contained in the echo cancellation circuit EC.

The echo cancellation filter EC incorporated in the transceiver according to the prior art, as is illustrated in FIG. 1, contains active circuit components with operational amplifiers which are supplied with voltage with a supply voltage $U_v$ of the transceiver. In order to minimize power losses, the supply voltage UV of the transceiver is increasingly chosen to be lower. Increasingly, technology dictates the use of transceivers which operate with a low supply voltage of less than 3.3 V.

The controllable switches contained in the echo cancellation filter EC are conventionally realized by controllable MOS transistors whose gate terminals are driven by the control circuit. On account of the signal voltage swing occurring at the MOS field-effect transistors between the respective drain terminal and the source terminal, considerable nonlinear signal distortions occur in conventional echo cancellation filters and impair the echo signal cancellation.

SUMMARY OF THE INVENTION

The object of the present invention, therefore, is to provide a programmable echo cancellation filter which has minimal nonlinear signal distortions.

The invention provides a programmable echo cancellation filter for echo signal cancellation for a transceiver having
a signal input for receiving the transmission signal emitted by the transceiver,
an input resistor connected to the signal input,
an operational amplifier, whose signal input is connected to the input resistor and whose signal output is connected to an output resistor,
a first programmable resistor circuit, which is provided between the signal output of the operational amplifier and the signal input of the operational amplifier,
a second programmable resistor circuit, which is provided between the output resistor and a signal output of the echo cancellation filter,
a third programmable resistor circuit, which is provided between the first programmable resistor circuit and the signal output of the echo cancellation filter,
the programmable resistor circuits each having a plurality of resistors which are terminated in parallel and are connected to a first terminal of an associated controllable switch, the controllable switches having a second terminal connected to a virtual reference voltage terminal with a negligible voltage swing.

Thus, according to the invention, the controllable switches are connected by their second terminal to a reference voltage terminal with a very low voltage swing, with the result that the nonlinear signal distortions at the controllable switches are minimal.

In this case, the virtual reference voltage terminal is an input terminal of an operational amplifier which forms a virtual ground.

In this programmable echo cancellation filter according to the invention, the controllable switches of a programmable resistor circuit preferably each have a control terminal which is connected via a control line to a control circuit for setting the resistance of the resistor circuit.

The control circuit is preferably a DSP processor.

The controllable switches are preferably MOSFET transistors whose controllable gate terminals are driven by the control circuit.

The programmable echo cancellation filter according to the invention preferably has a capacitor which is connected to a relatively low-impedance line node of the echo cancellation filter.

The programmable echo cancellation filter according to the invention has the advantage that it requires only one capacitor for generating the required filter transfer function.

The controllable switches of the first programmable resistor circuit are preferably connected to the signal input of the operational amplifier as virtual reference potential terminals.

The controllable switches of the second programmable resistor circuit and the controllable switches of the third programmable resistor circuit are preferably connected to the signal input of an operational amplifier of an automatic gain control circuit of the transceiver.

The echo cancellation filter according to the invention is preferably supplied with a low supply voltage.

In a particularly preferred embodiment, the echo cancellation filter according to the invention is of fully differential construction.

In a preferred embodiment, the echo cancellation filter according to the invention is constructed as a first order analog low-pass filter.

The signal input of the echo cancellation filter according to the invention is preferably connected to a signal matching circuit for signal matching of the transmission signal.

The signal output of the echo cancellation filter according to the invention is preferably connected to the signal input of an automatic gain control circuit in a reception signal path of the transceiver.

The resistors contained in the programmable resistor circuits preferably have mutually weighted resistances.

In a preferred embodiment of the echo cancellation filter according to the invention, the gain of the echo cancellation filter is adjustable in a frequency range lying below a first cut-off frequency and the gain of the echo cancellation filter is adjustable in a frequency range lying above a second cut-off frequency, by the control circuit.

In this case, the two cut-off frequencies of the echo cancellation filter are preferably likewise adjustable by the control circuit.

Preferred embodiments of the programmable echo cancellation filter according to the invention are described below with reference to the accompanying figures in order to elucidate features that are essential to the invention.

Figure 1:
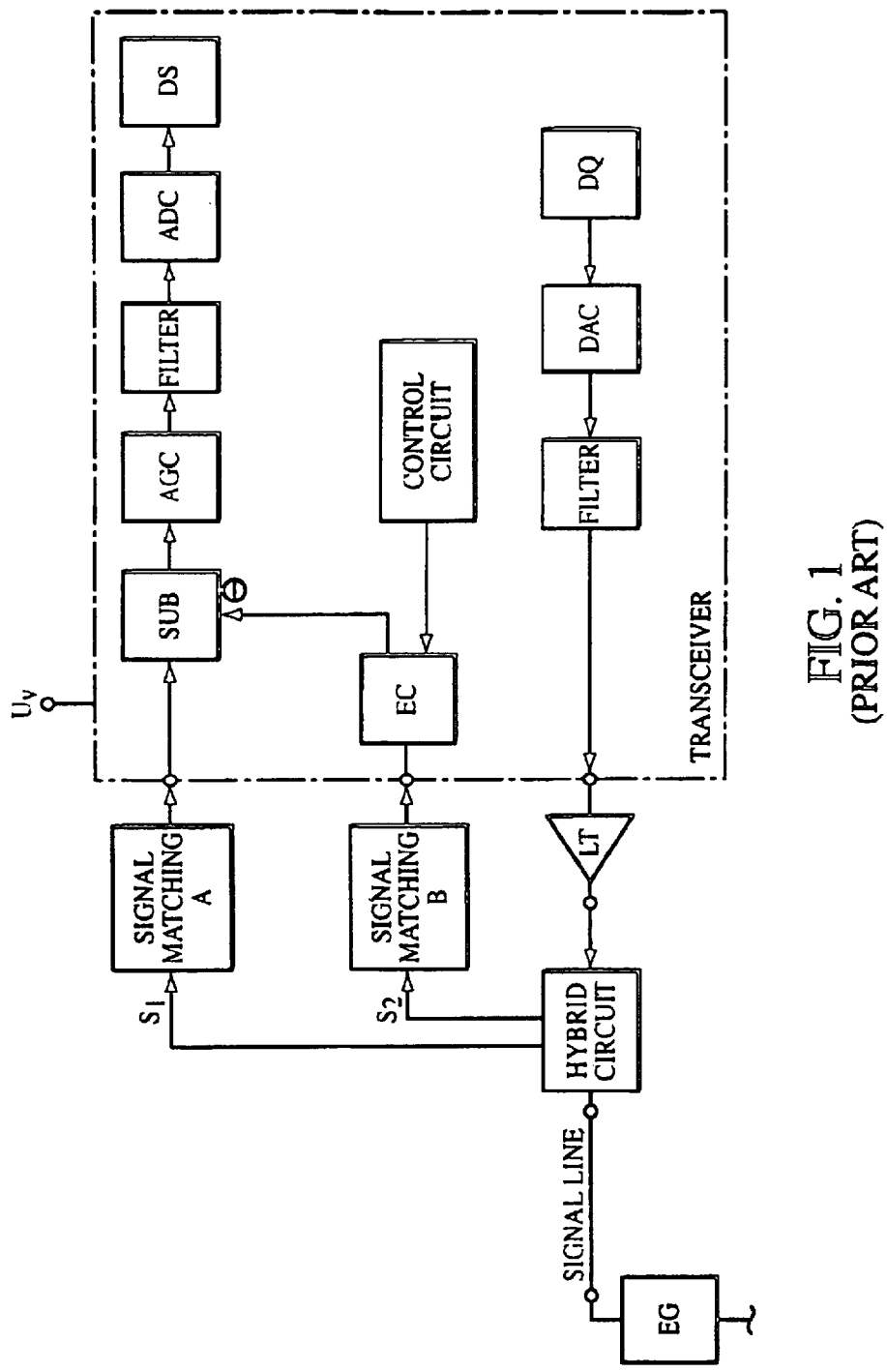
FIG. 1 shows a transceiver with echo cancellation filter according to the prior art.
Figure 2:
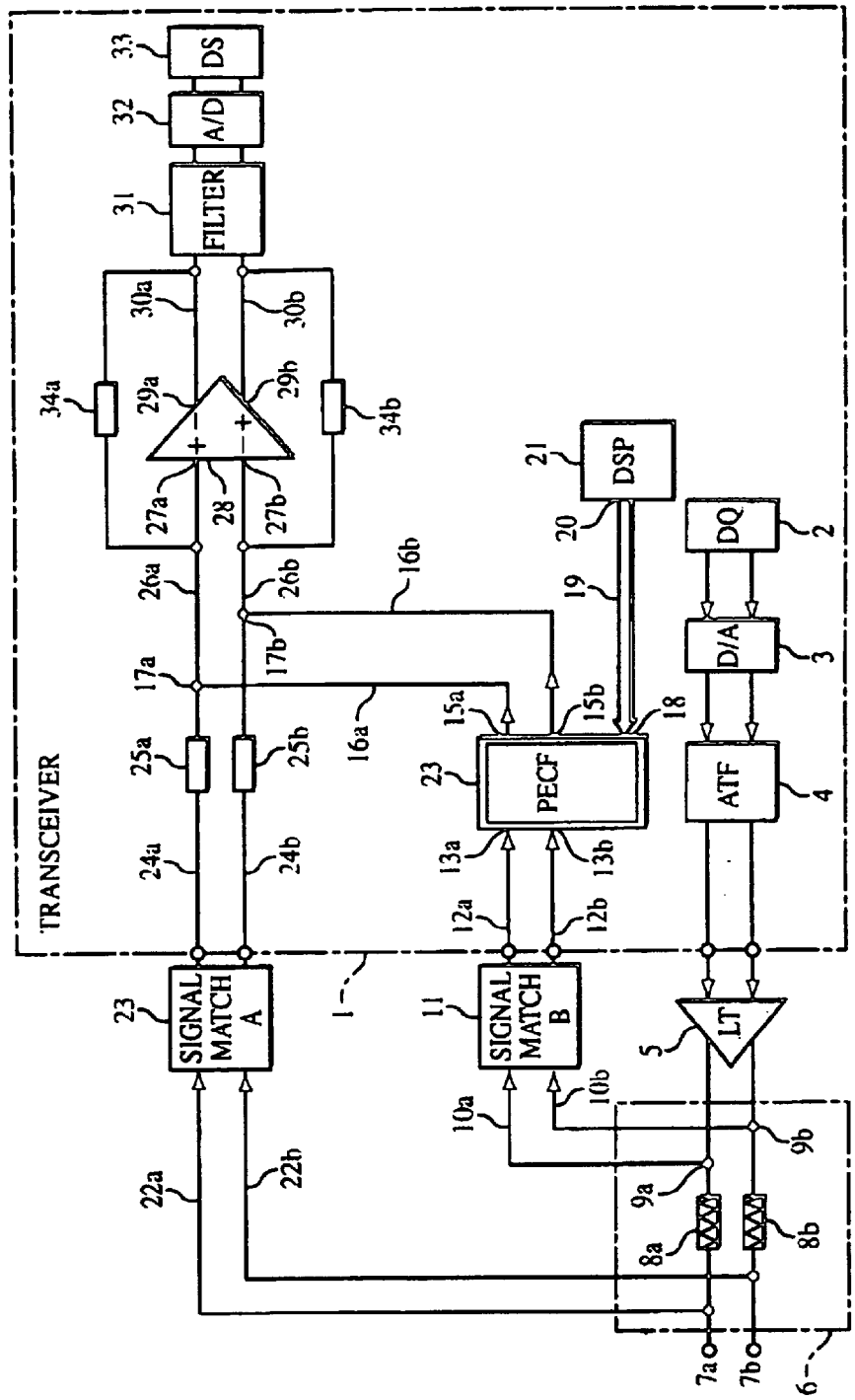
FIG. 2 shows a transceiver of fully differential construction with a fully differential echo cancellation filter according to the invention.

As can be seen from FIG. 2, the transceiver 1 contains a data source 2 for emitting transmission data to a digital/analog converter 3, which converts the transmission data into an analog transmission signal and emits it to an analog transmission filter 4. The filtered analog transmission signal is amplified by a line driver 5 and emitted to line terminals 7a, 7b via a hybrid circuit 6. Connected to the line terminals 7a, 7b is a signal line, for example a two-wire telephone line, which transmits the transmission signal to a subscriber terminal device. The hybrid circuit 6 contains two resistors 8a, 8b. At nodes 9a, 9b, the transmission signal emitted by the driver circuit 5 is branched off via lines 10a, 10b, to a signal matching circuit 11, which carries out prefiltering and signal amplitude matching. The signal matching circuit 11 is connected via lines 12a, 12b to signal inputs 13a, 13b of a programmable echo cancellation filter 14 according to the invention. The echo cancellation filter 14 is preferably of fully differential construction and has two signal outputs 15a, 15b connected via lines 16a, 16b to summation nodes 17a, 17b in the reception signal path of the transceiver 1. Furthermore, the programmable echo cancellation filter 14 according to the invention has a control input 18 connected via control lines 19 to an output 20 in a control circuit 21.

The control circuit 21 is preferably a digital signal processor. The DSP signal processor 21 carries out the settings in the echo cancellation filter 14 according to the invention via the control line 19.

The reception signal arriving via the terminals 7a, 7b is fed together with the echo signal that occurs via signal lines 22a, 22b to a further signal matching circuit 23. The signal matching circuit 23 prefilters the incoming signal and carries out signal amplitude matching. On the output side, the signal matching circuit 23 is connected via lines 24a, 24b to input resistors 25a, 25b of an automatic signal gain control circuit AGC. The resistors 25a, 25b are connected to signal inputs 27a, 27b of an operational amplifier 28 via lines 26a, 26b. The operational amplifier 28 has two signal outputs 29a, 29b, which are connected to a filter 31 via lines 30a, 30b. Connected downstream of the filter 31 is an analog/digital converter circuit 32, which converts the filtered reception signal into a digital reception signal and emits it to a data sink 33 of the transceiver 1. The signal output 29a of the operational amplifier 28 is connected via a feedback resistor 34a to the noninverting signal input 27a of the operational amplifier 28. The second signal output 29b of the operational amplifier 28 is connected via a feedback resistor 34b to the inverting signal input 27b of the operational amplifier 28.

Figure 3:
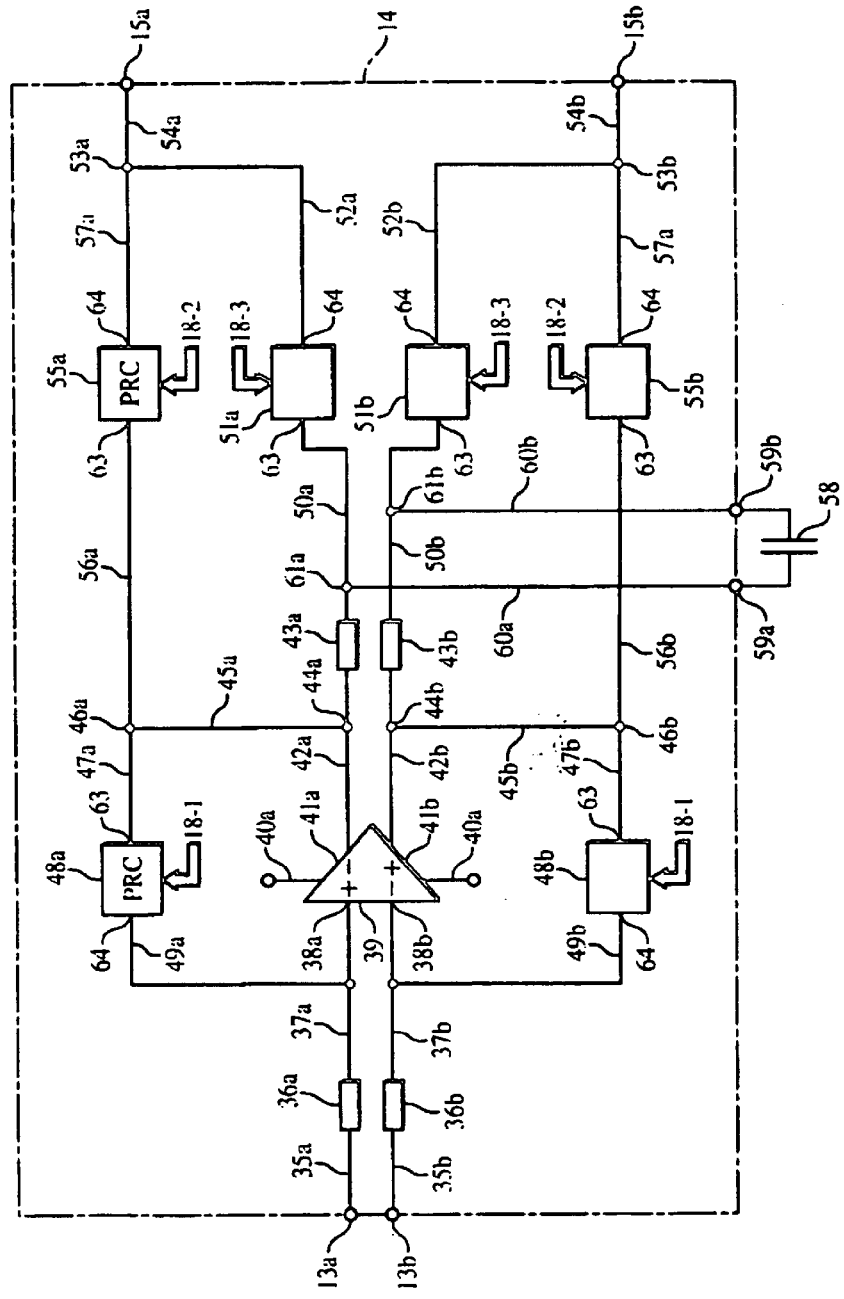
FIG. 3 shows the circuitry construction of a preferred embodiment of the programmable echo cancellation filter according to the invention.

FIG. 3 shows the circuitry construction of a particularly preferred embodiment of the programmable echo cancellation filter 14 according to the invention.

The echo cancellation filter 14 is of fully differential construction in the embodiment illustrated in FIG. 3. The echo cancellation filter 14 has a signal input 13a, 13b for receiving the matched transmission signal emitted by the transceiver 1. The signal input 13a, 13b is connected via lines 35a, 35b, input resistors 36a, 36b and lines 37a, 37b to the two signal inputs 38a, 38b of an operational amplifier 39 of fully differential construction. The operational amplifier 39 of fully differential construction has two supply voltage terminals 40a, 40b and is supplied with the supply voltage UV of the transceiver 1. The operational amplifier 39 has two signal outputs 41a, 41b, which are connected via lines 42a, 42b to output resistors 43a, 43b of the operational amplifier 39. At nodes 44a, 44b, the signal outputs 41a, 41b of the operational amplifier 39 are connected via lines 45a, 45b to a node 46a, 46b which is connected to a first programmable resistor circuit 48a, 48b via a line 47a, 47b.

The first programmable resistor circuits 48a, 48b are connected via a line 49a, 49b to the signal input 38a, 38b of the operational amplifier 39 of fully differential construction. The resistor circuits 48a, 48b each contain a plurality of parallel-connected resistors with associated controllable switches which are connected to the control input 18 of the echo 1 cancellation filter 14 and are controlled by the DSP processor 21.

The output resistors 43a, 43b of the operational amplifier 39 are connected to second programmable resistor circuits 51a, 51b via lines 50a, 50b. The resistor circuits 51a, 51b likewise contain parallel-connected resistors with associated controllable switches which are connected to the control terminal 18 of the echo cancellation filter 14. The second programmable resistor circuits 51a, 51b are connected via lines 52a, 52b to nodes 53a, 53b, which are connected to the signal output 15a, 15b of the echo cancellation filter 14 via lines 54a, 54b.

The echo cancellation filter 14 furthermore contains third programmable resistor circuits 55a, 55b. The programmable resistor circuits 55a, 55b are connected to the node 46a, 46b via lines 56a, 56b and to the node 53a, 53b via lines 57a, 57b.

The echo cancellation filter 14 furthermore has a capacitor 58, which, in the embodiment illustrated in FIG. 3, is externally connected to the echo cancellation filter 14 via terminals 59a, 59b. The capacitor terminals 59a, 59b are connected via lines 60a, 60b to nodes 61a, 61b between the output resistor 43a, 43b, of the operational amplifier 39 and the second programmable resistor circuit 51a, 51b. The capacitor 58 is preferably fitted on a circuit board of the transceiver 1 using SMD technology (SMD: Surface Mounted Device). The capacitor 58 is connected to the relatively low-impedance signal nodes 61a, 61b of the echo cancellation filter 14 and is not connected to a high-impedance virtual reference potential. It is possible for the capacitor 58 to be externally connected via the capacitor terminals 59a, 59b without the electromagnetic compatibility EMC of the echo cancellation filter 14 decreasing. The implementation of the capacitor 58 as an SMD capacitor means that the capacitor 58 has a very small chip area. By way of example, the capacitor area of an SMD capacitor 58 is about 2–3 mm² given a capacitance of up to 10 nF. In an alternative embodiment, the capacitor 58 is integrated internally in the echo cancellation filter 14. The area requirement is larger in this case, lying above 10 mm² given a capacitance of about 10 nF.

Figure 4:
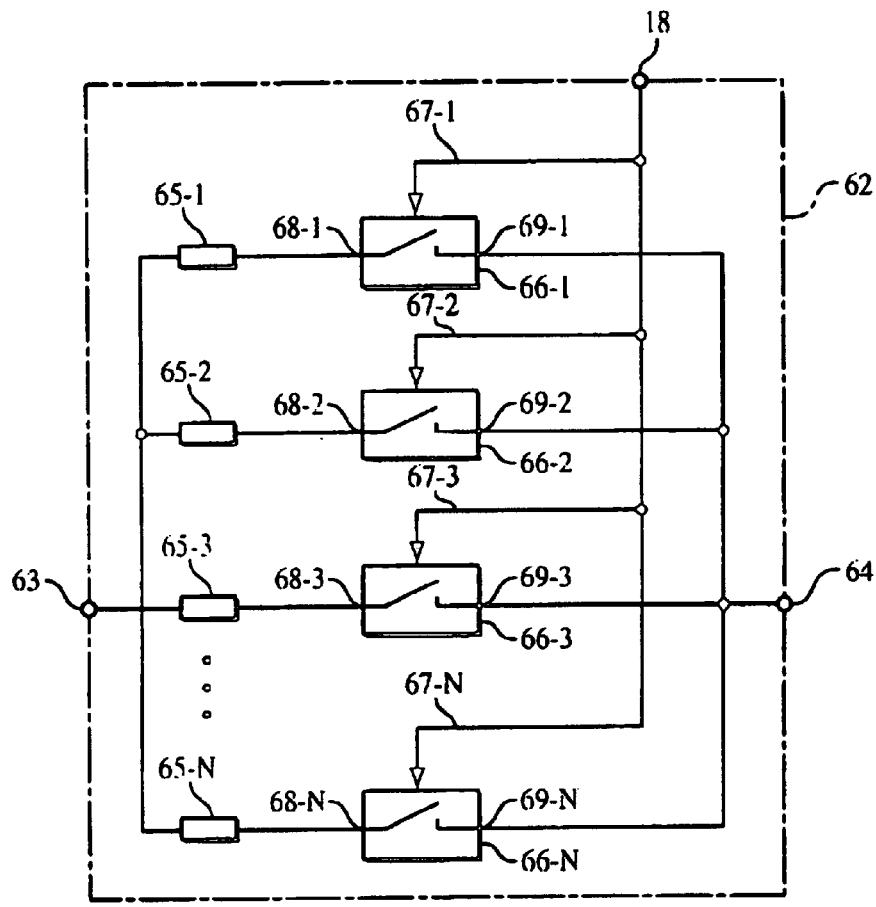
FIG. 4 shows the circuitry construction of a programmable resistor circuit, as is incorporated in the echo cancellation filter according to the invention.

FIG. 4 shows the circuitry construction of a programmable resistor circuit 62, as is contained as resistor circuit 48a, 48b, 51a, 51b, 55a, 55b in the echo cancellation filter 14 according to the invention which is illustrated in FIG. 3.

The programmable resistor circuit 62 illustrated in FIG. 4 has a first terminal 63 and a second terminal 64. N resistors 65-1 to 65-n are connected to the first terminal 63 in parallel. Associated controllable switches 66 are respectively connected in series with the resistors 65. The controllable switches 66 are preferably controllable MOSFET transistors. The controllable switches each have a control terminal 67 connected to the control input 18 of the echo cancellation filter 14. The controllable switches 66 are switched under the control of the DSP processor 21. The controllable switches 66 each have a first terminal 68, connected to the associated resistor 65, and a second terminal 69 connected to the terminal 64. In this case the terminal 64 of all the programmable resistor circuits 62 contained in the echo cancellation filter 14 is connected to a virtual reference voltage terminal with a low voltage swing, with the result that the signal distortions occurring at the controllable switches 66 are minimal.

The controllable switches 66 of the first programmable resistor circuits 48a, 48b are connected to the virtual signal inputs 38a, 38b of the operational amplifier 39, as can be seen from FIG. 3.

The controllable switches 66 of the second programmable resistor circuits 51a, 51b and the controllable switches 66 of the third programmable resistor circuit 55a, 55b are connected via the signal outputs 15a, 15b of the echo cancellation filter 14 and via the lines 16a, 16b to the signal inputs 27a, 27b of the operational amplifier 28 of the automatic gain control circuit of the transceiver 1, as can be seen from FIGS. 2 and 3. The signal inputs of the operational amplifiers 39, 28 are at very high impedance and have a voltage swing of almost zero, since they form a virtual ground.

The operational amplifier 39 illustrated in FIG. 3 forms an active input stage for impedance decoupling of the echo cancellation filter from the signal matching circuit 11 connected upstream. On account of the impedance decoupling, the required algorithm that is executed in the DSP processor 21 and serves for dynamically matching the switch positions after a connection has been set up in the training phase of the transceiver 1 is relatively simple. The echo cancellation filter 14 according to the invention has a constant input resistance on account of the amplifier input stage.

The echo cancellation filter 14 according to the invention which is illustrated in FIG. 3 requires only one active amplification stage and therefore has only a very small number of active circuit components. Therefore, the power consumption of the echo cancellation filter 14 according to the invention is very low and, what is more, the noise power of the echo cancellation filter 14 according to the invention is very low. In a preferred embodiment, the operational amplifier 39 of the echo cancellation circuit 14 is supplied with a low supply voltage of just 3.3 V via the supply voltage terminals 40a, 40b. In a preferred embodiment, the noise of the echo cancellation filter 14 preferably lies below −148 dBm/Hz, the power consumption being only 25 mW in the case of a frequency band of 1.1 MHz. The TDH (Total Harmonic Distortion) is less than −85 dB.

The area requirement of the echo cancellation filter 14 according to the invention, as illustrated in FIG. 3, is just 0.33 mm², e.g. in the case of a 0.65μ fabrication process, and is thus very small.

The transfer function of the echo cancellation filter 14 according to the invention is adjustable in a simple manner by the DSP processor 21. The echo cancellation filter 14 is preferably a first-order low-pass filter. In this case, the gain of the echo cancellation filter is separately adjustable by the DSP processor in a frequency range lying below a first cut-off frequency and in a frequency range lying above a second cut-off frequency. In this case, the two cut-off frequencies of the echo cancellation filter are likewise adjustable by the DSP processor 21.

Figure 5:
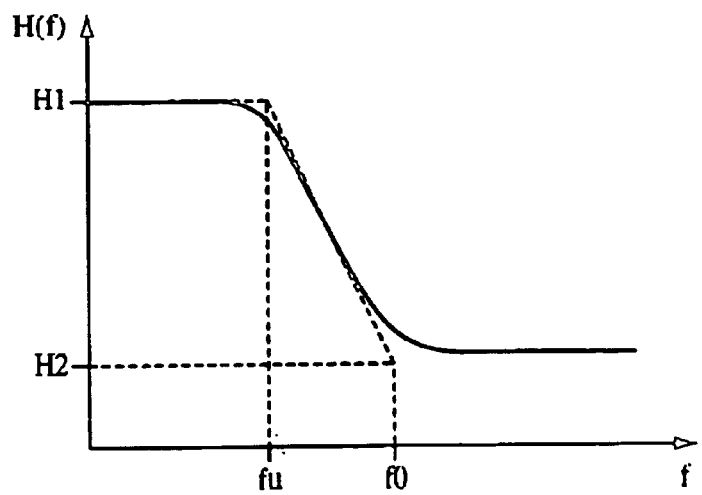
FIG. 5 shows the frequency profile of the programmable echo cancellation filter according to the invention.

FIG. 5 shows the frequency response of a preferred embodiment of the echo cancellation filter 14 according to the invention. The adjustable gain of the echo cancellation filter amounts to $H_1$ up to a lower cut-off frequency fu and the adjustable gain of the echo cancellation filter 14 amounts to $H_2$ above an upper cut-off frequency $f_O$. In the transition frequency range between the lower cut-off frequency $f_U$ and the upper cut-off frequency $f_O$, the gain decreases e.g. by 20 dB per decade. The DSP processor 21 can adjust the gain $H_1$ of the echo cancellation filter 14 and also the two cut-off frequencies $f_U$, $f_1$ by driving the controllable switches 66 contained in the resistor circuits.

The transfer function of the echo cancellation filter 14 illustrated in FIG. 3 reads as follows:

$$H(w) = K \cdot \frac{1 + jwC_{58} \frac{R_{48} \cdot R_{51}}{R_{55} + R_{43} + R_{51}}}{1 + jwC_{58} \frac{R_{43} \cdot R_{51}}{R_{43} + R_{51}}} \quad (1)$$

where the gain k is:

$$K = \frac{R_{48}}{R_{36}} \cdot \frac{R_{25}}{R_{55}} \left(1 + \frac{R_{55}}{R_{43} + R_{51}}\right) \quad (2)$$

The resistances $R_{48}$, $R_{51}$, $R_{55}$ of the three programmable resistor circuits 48, 51, 55 are adjustable or programmable by the DSP processor 21 for setting the gain, the upper cut-off frequency $f_1$ and the lower cut-off frequency $f_U$.

The resistances $R_{36}$ and $R_{43}$ of the input resistors 36 and of the output resistors 43 are constant, just like the resistance $R_{25}$ of the input resistor of the automatic gain control circuit. The capacitance $C_{58}$ of the capacitor 58 is also fixedly prescribed.

Through the programming or setting of the resistor circuits 48, 51, 55, the DSP controller 21 is able to alter the frequency response of the echo cancellation filter 14, as is illustrated in FIG. 5, in accordance with the transmitted transmission signal and the changes in impedance that occur on the signal line. On account of the minimal voltage swings at the controllable switches 66 contained in the programmable resistor circuits 48, 51, 55, the linear signal distortions that occur become minimal in this case, with the result that the echo cancellation signal 14 completely cancels the echo signal that occurs. The echo cancellation filter 14 according to the invention requires only one capacitor 58, which, moreover, can be mounted externally using SMD technology in an area-saving manner. The echo cancellation circuit 14 according to the invention contains only one active amplifier stage 39 for impedance decoupling, with the result that the power consumption of the echo cancellation filter 14 according to the invention is low and the echo cancellation filter 14 itself has a very low noise power. The algorithm required for programming the echo cancellation filter 14 within the DSP processor 21 is relatively simple, with the result that the circuitry outlay for the DSP processor 21 likewise decreases.

The echo cancellation filter 14 according to the invention is particularly suitable for incorporation in transceivers for xDSL signals.

What is claimed is:

1. A programmable echo cancellation filter for echo signal cancellation for a transceiver, said filter comprising:
   a signal output;
   a signal input for receiving a transmission signal emitted by the transceiver;
   an input resistor connected to the signal input;
   an operational amplifier, having a signal input connected to the input resistor and having a signal output connected to an output resistor;
   a first programmable resistor circuit provided between the signal output of the operational amplifier and the signal input of the operational amplifier;
   a second programmable resistor circuit provided between the output resistor and the signal output;
   a third programmable resistor circuit provided between the first programmable resistor circuit and the signal output;
   the first, second, and third programmable resistor circuits each having a plurality of switching elements connected in parallel each switching element having a resistor and an associated controllable switch,
   each controllable switch having a first terminal connected to the resistor and a second terminal connected to a virtual reference voltage terminal.

2. The programmable echo cancellation filter as claimed in claim 1, further comprising a control terminal associated with each of the controllable switches, of the programmable resistor circuit, the control terminal being connected via a control line to a control circuit for setting the resistance of the programmable resistor circuit.

3. The programmable echo cancellation filter as claimed in claim 2 wherein the control circuit comprises a DSP processor.

4. The programmable echo cancellation filter as claimed in claim 1, wherein the controllable switches comprise MOSFET transistors having controllable gate terminals.

5. The programmable echo cancellation filter as claimed in claim 1, further comprising a capacitor connected to a low-impedance node.

6. The programmable echo cancellation filter as claimed in claim 1 wherein the controllable switches of the first programmable resistor circuit are connected to the signal input of the operational amplifier.

7. The programmable echo cancellation filter as claimed in claim 1, wherein, the controllable switches of the second programmable resistor circuit and the controllable switches of the third programmable resistor circuit are connected to the signal input of an operational amplifier of an automatic gain control circuit of the transceiver.

8. The programmable echo cancellation filter as claimed in claim 1, further comprising a supply voltage terminal for connection to a low supply voltage.

9. The programmable echo cancellation filter as claimed in claim 1, wherein the echo cancellation filter is of fully differential construction.

10. The programmable echo cancellation filter as claimed in claim 1, wherein the echo cancellation filter comprises a first-order analog low-pass filter.

11. The programmable echo cancellation filter as claimed in claim 1, wherein the echo cancellation filter comprises a higher order analog low-pass filter.

12. The programmable echo cancellation filter as claimed in claim 1, wherein the signal input is connected to a signal matching circuit for signal matching of the transmission signal.

13. The programmable echo cancellation filter as claimed in claim 1, wherein the signal output is connected to an automatic gain control circuit in a reception signal path of the transceiver.

14. The programmable echo cancellation filter as claimed in claim 1, wherein the resistors contained in the first, second and third programmable resistor circuits have weighted resistances.

15. The programmable echo cancellation filter as claimed in claim 1, wherein a first gain ($H_1$) of the echo cancellation filter is adjustable in a frequency range lying below a first cut-off frequency ($f_U$) and a second gain ($H_2$) of the echo cancellation filter is adjustable in a frequency range lying above a second cut-off frequency ($f_O$), by a control circuit.

16. The programmable echo cancellation filter as claimed in claim 15, wherein the first and second cut-off frequencies ($f_U$, $f_O$) of the echo cancellation filter are adjustable by the control circuit.

17. A transceiver for xDSL signals, the transceiver comprising a programmable echo cancellation filter as recited in claim 1.

* * * * *